United States Patent
Barnard

[11] Patent Number: 5,241,561
[45] Date of Patent: Aug. 31, 1993

[54] RADIO RECEIVER

[75] Inventor: Michael E. Barnard, Reigate, England

[73] Assignee: U.S. Philips Corporation, New York, N.Y.

[21] Appl. No.: 641,388

[22] Filed: Jan. 15, 1991

[30] Foreign Application Priority Data

Jan. 19, 1990 [GB] United Kingdom ............. 9001302

[51] Int. Cl.[5] ........................................... H04K 1/00
[52] U.S. Cl. ........................................ 375/1; 342/357
[58] Field of Search ............................ 375/1; 342/357

[56] References Cited

U.S. PATENT DOCUMENTS

| | | | |
|---|---|---|---|
| 4,100,498 | 7/1978 | Alsup et al. | 375/1 |
| 4,247,939 | 1/1981 | Stromswold et al. | 375/1 |
| 4,912,721 | 3/1990 | Pidgeon et al. | 375/1 |
| 4,943,976 | 7/1990 | Ishigaki | 375/1 |

Primary Examiner—Thomas H. Tarcza
Assistant Examiner—David Cain
Attorney, Agent, or Firm—David R. Treacy

[57] ABSTRACT

A radio receiver (16) for direct sequence spread spectrum signals incorporates a quadrature zero-IF architecture, means for comb filtering (36,37) the two quadrature related channels (I and Q) and a means of non-coherent demodulation of each channel; the non-coherent demodulating means comprising delays (40,41) and mixers (42,43). This process obviates the need for locally generated versions of the spreading code used to produce the signals and considerably shortens the time-consuming process of correlating the received and the locally generated codes at receiver switch-on.

17 Claims, 5 Drawing Sheets

$$(X_1-X)^2 + (Y_1-Y)^2 + (Z_1-Z)^2 = (R_1-C_B)^2$$
$$(X_2-X)^2 + (Y_2-Y)^2 + (Z_2-Z)^2 = (R_2-C_B)^2$$
$$(X_3-X)^2 + (Y_3-Y)^2 + (Z_3-Z)^2 = (R_3-C_B)^2$$
$$(X_4-X)^2 + (Y_4-Y)^2 + (Z_4-Z)^2 = (R_4-C_B)^2$$

RADIO RECEIVER

This invention relates to a radio receiver, more particularly to a direct sequence spread spectrum (DSSS) radio receiver which includes a fast means of signal acquisition and which demodulates the data encoded within the received signal and having particular, but not exclusive, application to a global positioning system (GPS) of the NAVSTAR type.

The NAVSTAR system, when fully operational, is planned to provide a worldwide, 24 hour, all weather locating system based on a user's distance from three satellites. The NAVSTAR GPS and an embodiment of a receiver are described in "Global Positioning by Satellite" by Philip G. Mattos, Electronics and Wireless World, February 1989, pages 137–142 but the salient points of the system are repeated here. In the following description "the system" is taken to means the NAVSTAR global positioning system (GPS) when fully operational, with the satellite orbit and transmission details as currently planned.

The NAVSTAR system provides two positional services which operate in a substantially similar manner but which have differing degrees of accuracy. These two services are the Precise Positioning Service (PPS) which is predominantly for military systems and the Standard Positioning Service (SPS) which is available for non-military systems. The description herein will deal only with the SPS although many features are common to both the SPS and PPS.

The system is intended to consist of eighteen operational and six spare satellites in six orbits although this specification is subject to alteration. Each satellite circles the Earth approximately once every twelve hours. The satellites transmit data continuously on the same frequency of 1575.42 MHz using a direct sequence spread spectrum technique. The spread spectrum signals transmitted by each satellite contain detailed information about its orbit over the next two hours which information is known as the ephemeris and, at a lower rate, less detailed information about all the other satellites which information is known as the almanac. The information is transmitted by the satellites at a data rate of 50 bits per second (bps) giving it an inherent bandwidth of approximately 100 Hz. Prior to modulation of a carrier signal the width of the frequency spectrum of the data signal is spread to approximately 2 MHz by multiplying it together with a Pseudo Random Noise Sequence. Pseudo Random Noise (PRN) is so called because it appears random but is actually carefully defined and can be reconstructed using an easily defined algorithm. In the case of the SPS the PRN sequence is a Gold code, so named due to its inventor, with a length of 1023 chips, where a chip is a subsegment of a PRN signal with a constant amplitude of either one or minus one. This code is transmitted in its entirety once every millisecond so there are twenty complete cycles of it per data bit, in other words the chip rate of the PRN is 1.023 NHz. The resulting signal transmitted by each satellite thus has a bandwidth of approximately 2 MHz and a very low power of the order of $-163$ dBW. The Gold codes chosen have very good autocorrelation properties, that is, when multiplied by themselves, the product is considerably greater when the codes are at synchronism (that is, they have no relative delay) than at any other point. Since the satellites all transmit on the same carrier frequency, the Gold codes that they use are chosen to be different so that the user of the system can determine which satellite a particular signal has emanated from. To facilitate this the Gold codes are orthogonal with each other which means that they have very good cross-correlation properties and any two different codes multiplied together in any relative position to each other produce an output that is at least 20 dB lower than that produced by a code multiplied by itself at the correlation instant. In the case of the SPS, the PRN codes are also known as Coarse/Acquisition (C/A) codes as they are used for coarse positioning and as an initial signal acquisition aid for the PPS.

The system satellites are orbiting at a distance of approximately 26,600 km from the centre of the Earth and each travel at a speed in excess of 3 km per second. As a result the signals received by the user from the satellites contain a significant element of frequency shift due to the Doppler effect. Consequently a stationary GPS receiver must be capable of receiving over a frequency range of 35 4 kHz from the satellite carrier frequency but a mobile GPS receiver will suffer additional Doppler shift due to its own motion and will need to cater for a wider frequency range. In addition the local oscillator(s) of the first down conversion stage(s) within the receiver may have a frequency offset from the ideal of a similar magnitude to the Doppler offset. The subsequent, adjustable, local oscillator(s) must be capable of removing this offset as well.

To make a three dimensional position fix the user needs to receive transmissions from four satellites which for reasons of reception should ideally be at an angle of at least 5' above the horizon. To achieve this an omnidirectional antenna capable of receiving signals from almost a whole hemisphere is required. Four satellite transmissions are required to be received because the system works on the principle of calculating the user's range from known points by measuring the propagation time of signals from those points to the user. For the system to have adequate positional accuracy the transit time of the signals has to be known to better than one microsecond and preferably considerably more accurately than that. The satellites each have an onboard atomic clock to which their transmissions are synchronised but the normal user does not maintain a clock of comparable accuracy. The time kept by the user's clock differs from the satellite time by a clock bias, $C_B$, which is in effect a fourth unknown. By measuring the apparent range of the user from four satellites rather than three, the extra information obtained can be used to solve for $C_B$. The apparent ranges are called pseudoranges because they do not as yet take account of the user's clock bias. FIG. 1 of the accompanying drawings shows the basic elements of a system in operation in which signals from four satellites 11, 12, 13 and 14 are being received by a receiver 16 in a user's vehicle 15. The positions of the four satellites 11, 12, 13 and 14 are denoted in brackets on the figure using a Cartesian coordinate system with the origin being taken as the centre of the Earth. The pseudoranges of the signals from the four satellites are denoted R1, R2, R3 and R4, respectively. FIG. 2 of the accompanying drawings shows the equations used to calculate three accurate ranges and the clock bias from four pseudoranges, these equations generally being solved iteratively. It should be noted that the dimension of clock bias $C_B$ is distance and that the positional coordinates of the user in FIGS. 1 and 2 are given as X, Y, Z. To measure the transit time of the satellite signals with the required accuracy, the processing means within a user's receiver must have a precise measurement of the phase of the received C/A code. This is usually achieved by generating the C/A code for each satellite within the receiver and comparing the locally generated and incoming codes at a succession of closely spaced intervals until a good match or correlation is found. This process is usually referred to as circular correlation of the two signals and in this case it provides the sub-millisecond part of the transit time of the signal from the satellite to an accuracy of better than one microsecond. However since the C/A code repeats every millisecond, the integer number of milliseconds of the signal transit time cannot be calculated by this method and so must be known by some other means. This problem can be overcome if the receiver has a knowledge of the user's position to within 100 km since the integer number of milliseconds in each transit time is then calculable.

Normally, even though a receiver may only need to make a positional fix every few minutes it must continually track the signals from at least four satellites and often five since the positions of the satellites relative to the user changes with time and the best set of satellites to use for the positional fix alters with time. The process of tracking involves mainly keeping an up to date record of the satellites currently in view, their Doppler frequency offsets and the offset from zero of the C/A code received from each. When a receiver is first switched on the possible Doppler and first local oscillator frequency offsets are unknown, as are the displacements of the C/A codes for visible satellites so that to acquire just one satellite can take up to several minutes. Once the signals from one satellite have been received and decoded, the almanac can be used to reduce the search time required for the subsequent satellites since the receiver can then calculate which satellites to search for and their approximate Doppler frequency offsets.

This process is still very time consuming, however, and in order to hasten the process of satellite acquisition many receivers maintain a clock and a record of the almanac even when other parts of the receiver are switched off. This ploy will fail, nevertheless, after a long period of receiver inactivity because its almanac will be out of date. Also, particularly in urban environments when positional accuracy is arguable most important, satellites may not be in the direct view of the receiver antenna for significant periods of time. When enough satellites are again in view it may not be for a long enough period of time to require the necessary signals and make a positional fix due to the time required to circularly correlate the received signal with the locally generated C/A code.

An object of the present invention is to reduce the time required to acquire DSSS signals.

According to the present invention there is provided a radio receiver for use with direct sequence spread spectrum signals which have been spread in frequency by a pseudo random noise (PRN) sequence, comprising means for producing a pair of quadrature related signals from a received direct sequence spread spectrum signal, comb filtering means for respectively filtering the quadrature related signals at n times the repetition frequency of the PRN sequence, where n is an integer, and means for non-coherently demodulating and despreading the comb-filtered signals.

The present invention also provides a radio receiver for use with the NAVSTAR global positioning system (GPS), comprising means for producing a pair of quadrature related signals from a received satellite transmission, comb filtering means for respectively filtering the quadrature related signals at n times the repetition frequency of the coarse/acquisition (C/A) code, where n is an integer, and means for non-coherently demodulating and despreading the comb filtered signals.

The present invention is based upon the fact that codeless data extraction can be used to acquire the spread spectrum signals and this acquisition can be carried out relatively quickly because it obviates the need for local generation of the pseudo random codes and conducting a search of all the possible relative positions of the locally generated and incoming codes.

In operation the receiver exploits the repetitive nature of the PRN code used to spread the spectrum of the data. In the NAVSTAR system the data is encoded using binary phase shift keying (BPSk) and it is common practice to decode such signals using a non-coherent demodulation technique. Non-coherent demodulation involves multiplying the incoming data signal with a delayed replica of itself, the length of the delay being equal to the length of one data bit. Using non-coherent demodulation with a spread spectrum signal will additionally despread the PRN code since PRN codes consist of 1 and $-1$ components and there are an integer number of PRN code cycles per data bit. Each segment of PRN code will thus be multiplied by the equivalent segment from another PRN cycle, the product will be 1 and the signal will have been despread. However, the signals received from the NAVSTAR system will typically be received at a signal to noise (S/N) ratio of $-20$ dB and non-coherent demodulation has the effect of squaring the signal to noise ratio or multiplying its decibel representation by 2. The output of the non-coherent demodulation process in this case would thus have a signal to noise ratio of approximately $-40$ dB. This can be improved by low pass filtering since, after despreading, data is present over approximately a 100 Hz bandwidth and noise is present over approximately a 2 MHz bandwidth. A suitably chosen low pass filter can thus achieve a S/N ratio improvement of approximately 40 dB but the overall S/N ratio will still be in the region of 0 dB and the data will be masked by the noise. In a receiver made in accordance with the present invention a S/N ratio improvement is made before the non-coherent demodulation process by exploiting the repetitive nature of the incoming spread spectrum signal. Since the C/A code repeats every millisecond, the frequency spectrum of the incoming signal has significant peaks at 1 kHz and integer multiples of it with additional frequency components due substantially to noise. Insertion of a suitable comb filter, that is a filter whose passbands have a frequency spectrum of equidistant peaks, before the demodulation can improve the S/N ratio of the incoming signal. The non-coherent demodulation process then causes a deterioration of S/N ratio but, provided that the comb filter improves the S/N ratio sufficiently, the output of the post-demodulation low pas filter has a positive signal to noise ratio and recovery of the data is possible.

The demands placed on the filters in a receiver of this type are quite stringent and this adds both to the complexity and expense of the receiver. Conventional mixers, as used to perform a number of tasks in this receiver, produce a number of image frequency components at their outputs that are often unwanted. One or more of these image frequency components can be close in frequency to the desired output component and this places additional demands upon the filters. In an application such as this where both In-phase and Quadrature signal components are available, the option exists to use exponential multipliers to perform frequency conversions and other mixing operations. An exponential multiplier (EM) performs a simple trigonometrical operation that does not generate any image frequency components at its output although it has the drawback of requiring both multiplier inputs to be available in both their In-phase and Quadrature forms. The operation of an exponential multiplier will be described later in conjunction with FIG. 5 of the accompanying drawings.

Embodiments of the invention will not be described, by way of example, with reference to FIGS. 3 to 7 of the accompanying drawings. In the drawings.

In the drawings the same reference numerals have been used to indicate corresponding features.

Figures 1, 2:
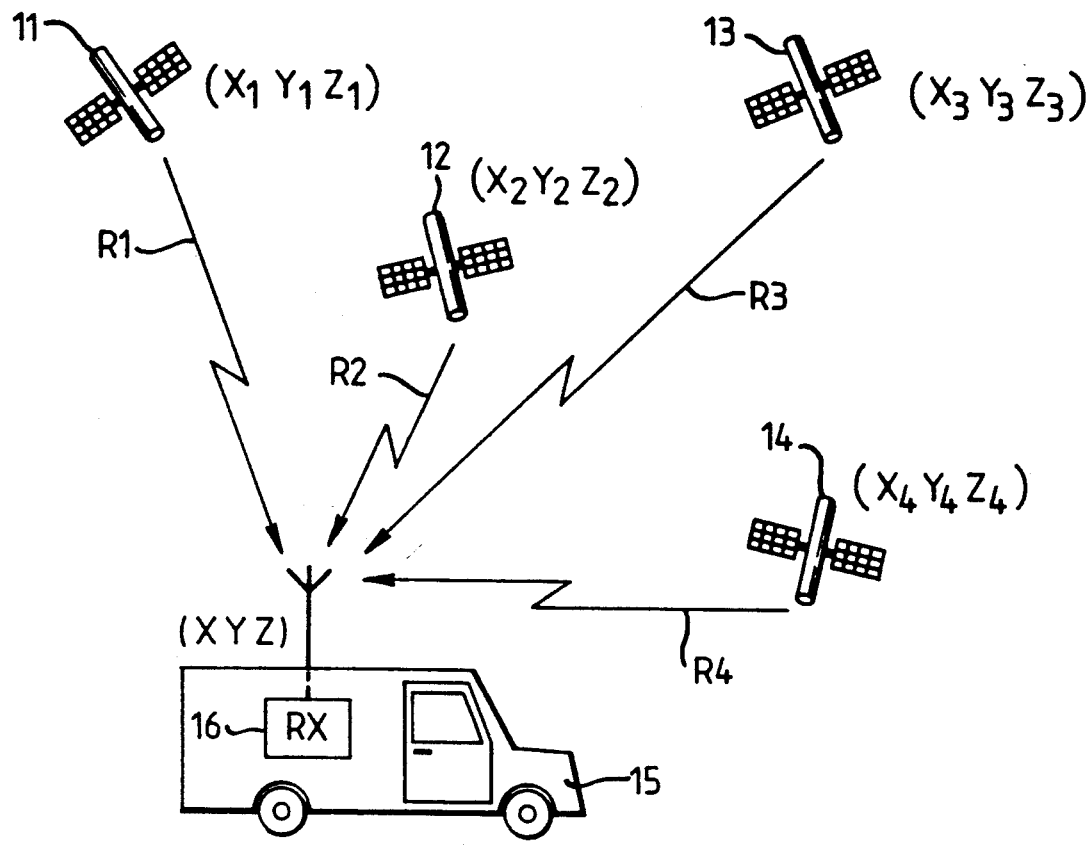
FIG. 1 illustrates diagrammatically a GPS system in which a mobile user is receiving signals from four GPS satellites.
FIG. 2 shows the four equations used to calculate a three dimensional position fix and the receiver clock bias from four satellite pseudoranges.
Figure 3:
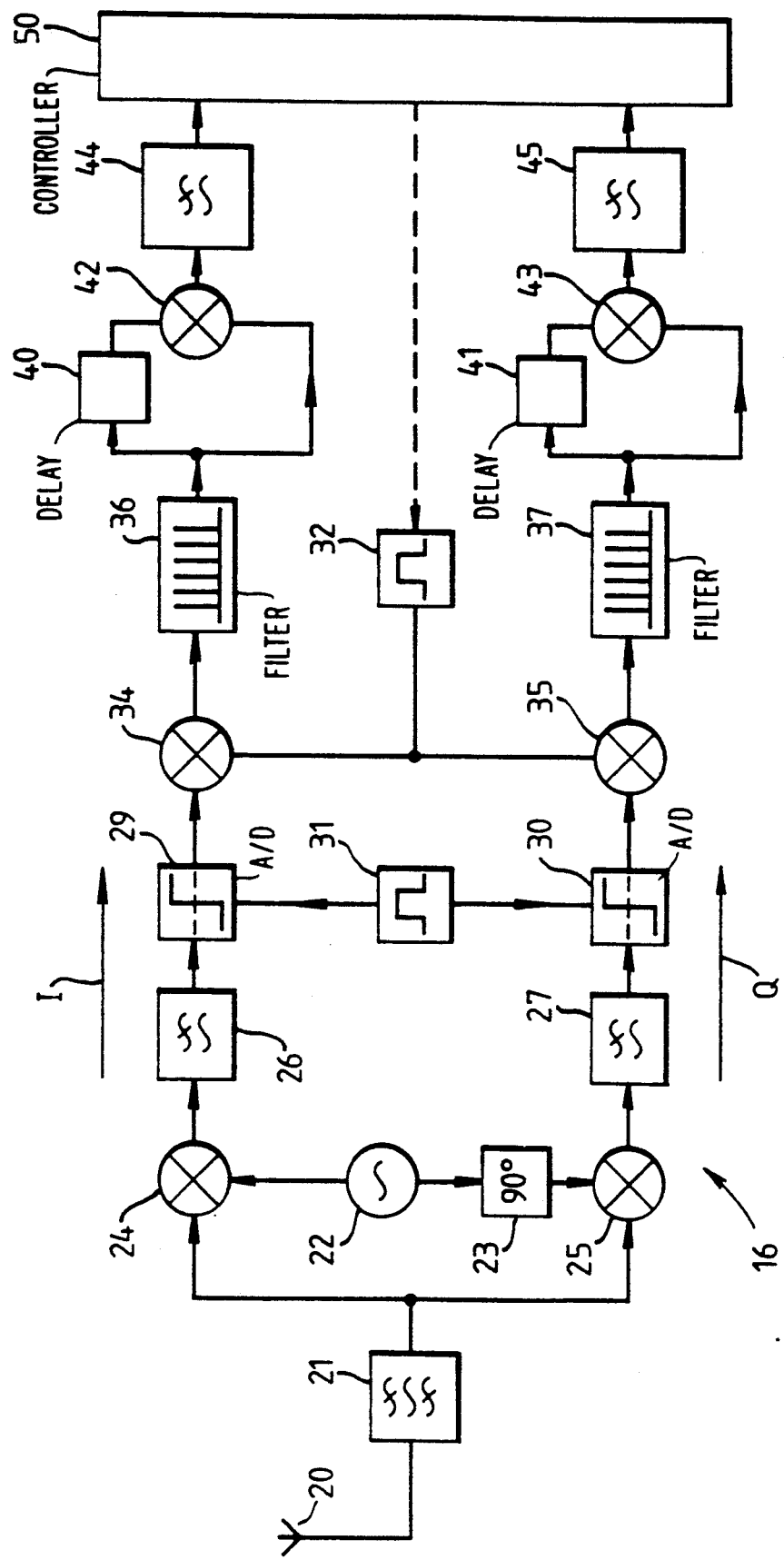
FIG. 3 is a block schematic diagram of a complete, zero IF based receiver configured for fast signal decoding.

An embodiment of a receiver made in accordance with the present invention configured to search the range of frequencies over which satellite signals may occur in a NAVSTAR GPS is shown in block schematic form in FIG. 3.

Satellite signals are received by an omnidirectional antenna 20 of a receiver 16 and are fed to an amplifying and bandpass filtering means 21. In some cases, the band pass filtering means 21 may comprise a more complex circuit performing frequency translation as well as bandpass filtering. The output of the means 21 is then split into two paths, each of which is connected to an input of a pair of mixers 24 and 25, respectively. A local oscillator 22 provides a signal which is also split between two paths. The first of these paths is fed direct to the second input of the mixer 24 and the second path is fed to a 90° phase shifter whose output is fed to the second input of the mixer 25. At the mixers 24,25 the incoming signal is mixed separately with the two locally generated waveforms which have the same frequency but are in phase quadrature. The frequency of the locally generated waveforms is the same as, or is close to, that of the incoming signal. The output of mixer 24 is designated the In-phase component I of the satellite signals and the output of mixer 25 is designated the Quadrature component Q. The outputs of mixers 24 and 25 are fed to separate low pass filters 26 and 27 respectively which pass the lowest, difference frequency component of the products of mixing only. These filtered signals are fed to respective Analogue to Digital (A/D) converters 29 and 30 which may comprise single bit devices or comparators. A/D converters 29 and 30 are both driven by a clock 31 which causes them to sample at a rate that satisfies the Nyquist sampling criterion with respect to the output bandwidth of filters 26 and 27, which equals or exceeds the bandwidth of the satellite C/A code. The digitised In-phase signal is then fed to a mixer 34 together with a signal generated by a local oscillator 32 and the digitised Quadrature signal is fed to a mixer 35 together with the output of the local oscillator 32. The frequency of local oscillator 32 is determined by a controller 50 in order that the difference (or sum) frequency outputs of the mixers 34 and 35 are baseband signals, that is they contain no remnant of the original carrier frequency. The outputs of the mixers 34 and 35 are fed to respective comb filters 36 and 37 whose purpose is to improve the signal to noise ratio of the baseband signals. These comb filters have a plurality of passbands at 1 kHz intervals which interval is chosen to correspond to the repetition frequency of the C/A code in the signals. The In-phase and Quadrature signals are then fed to separate non-coherent BPSK demodulators consisting of a delay 40 and a mixer 42, and a delay 41 and a mixer 43, respectively. The two delays 40 and 41 are of 20 ms each, which duration corresponds to the length of one bit of the received data.

The outputs of mixers 42 and 43 are despread and differentially demodulated satellite signals in which the output of mixer 42 is the In-phase component and the output of mixer 43 is the Quadrature component. The bandwidth of the data in these signals is now approximately 100 Hz but noise is still present over a much wider bandwidth and the signal to noise ratio is still negative. Low pass filters 44 and 45 are included between the mixers 42 and 43 respectively and a controller 40, these filters having a bandwidth of the order of that of the data signal. Such a bandwidth makes the signal to noise ratio positive and allows the controller 50 to recover the original satellite data. The controller 50 in this receiver is a microcomputer having input ports for monitoring the despread and demodulated satellite signals in both quadrature channels and an output port through which it also sets the frequency of local oscillator 32. For the purpose of a search for satellite signals this frequency takes on a series of stepped values. The frequency band currently under scrutiny by the controller 50 is determined by the frequencies of the local oscillators 22 and 32. The outputs of low pass filters 44 and 45 are monitored by the controller 50 for the presence of satellite signals in each frequency band. The width of these frequency bands and consequently the size of the frequency steps in the output of local oscillator 32 are of the order of the bandwidth of filters 44 and 45. In a receiver for use with the NAVSTAR system the bandwidth of filters 44 and 45 would be approximately 100 Hz. If a satellite signal is detected in a given band the controller 50 makes a record of its ephemeris and Doppler frequency offset.

Figure 4:
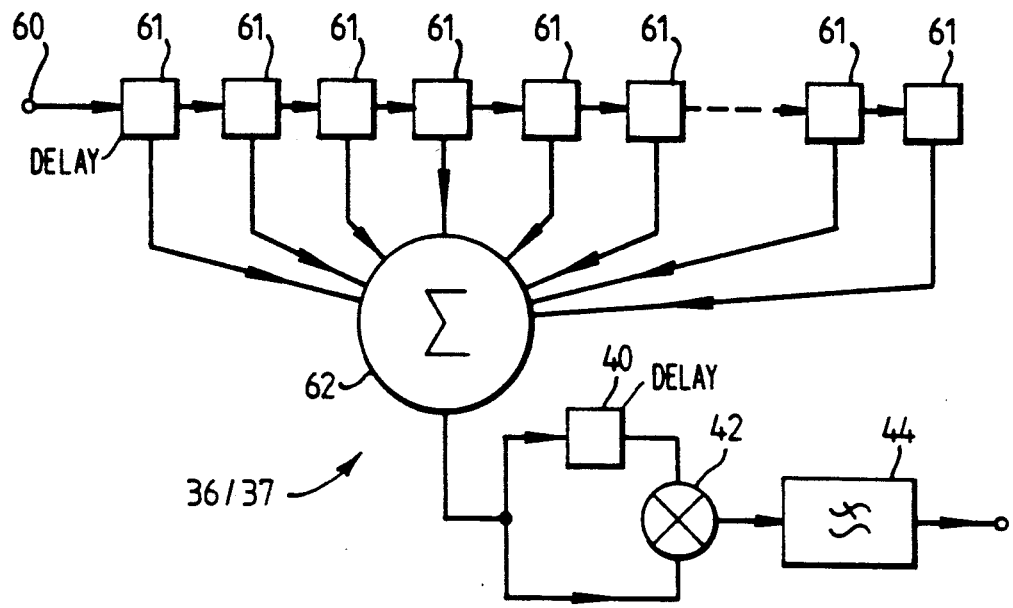
FIG. 4 is a block schematic diagram of an arrangement of a comb filter, non-coherent demodulator and a low pass filter, which arrangement is applicable to one channel of a receiver only.

FIG. 4 of the accompanying drawings shows an embodiment of the comb filter 36 or 37 used in the circuit of FIG. 3. A signal at an input 60 is fed in succession to a plurality of delay stages 61 whose delay is equal to the length of one cycle of C/A code, that is 1 ms. The outputs of the delay stages 61 are added in a summer 62 whose output is fed to the non-coherent demodulator 40. The number of delay stages 61 is dictated by the improvement in the signal to noise ratio of the signal required, twenty being the number employed in this embodiment as this is the number of complete cycles of C/A code per data bit in a GPS signal. Different numbers of stages are possible, however, and the delays need not all be of 1 ms duration, they could for example be integer multiples of 1 ms.

Figure 5:
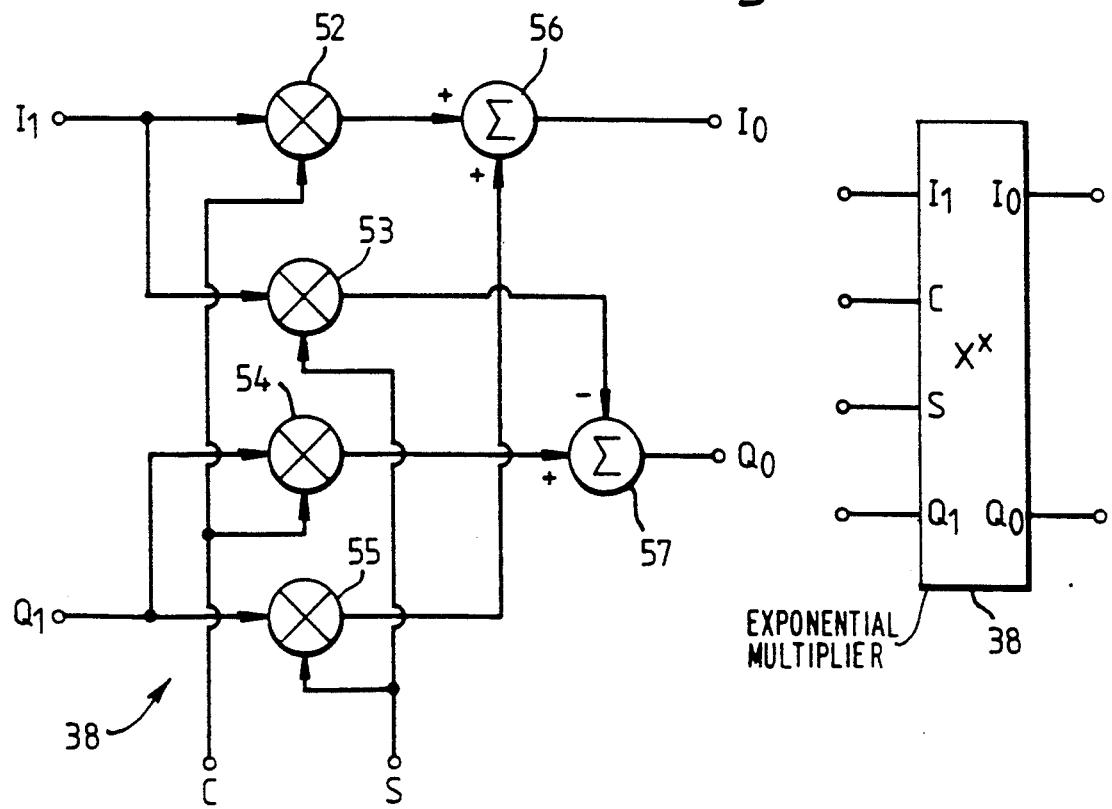
FIG. 5 is a block schematic diagram of an exponential multiplier, and the symbol used subsequently to represent it.

The signals being mixed by mixers 34, 35, 42 and 43 in FIG. 3 are quadrature related signals and the option thus exists to use exponential multipliers (EM) instead. Exponential multipliers can perform frequency conversions without generating unwanted image output signals as do normal mixers and the filtering normally required after a mixing stage can usually be less stringent when an exponential multiplier is used. FIG. 5 of the accompanying drawings shows a block schematic diagram of an exponential multiplier and the symbol used subsequently to represent it. Its operation is now described. A pair of quadrature related input signals rae fed to a pair of inputs $I_1$ and $Q_1$, respectively. In-phase input $I_1$ is fed to one input on each of two multipliers 52 and 53 while Quadrature input $Q_1$ is fed to one input on each of another two multipliers 54 and 55. A second pair of quadrature related inputs to the EM are denoted C and S. In-phase input C is fed to the remaining input of the multipliers 52 and 54 while Quadrature input S is fed to the remaining input of the multipliers 53 and 55. The outputs of the multipliers 52 and 55 are both fed to a summer 56 whose output forms the In-phase output $I_o$ of the exponential multiplier. The output of multiplier 53 is subtracted from the output of multiplier 54 in a subtractor 57 whose output forms the Quadrature output $Q_o$ of the exponential multiplier. The symbol 38 used to represent the exponential multiplier subsequently is shown on the right hand side of FIG. 5. The symbol consists of a rectangle containing the identification $X^x$, with the four inputs $I_1$, $Q_1$, C, S and the two outputs $I_o$, $Q_o$ marked within the periphery of the rectangle adjacent to their respective input and output terminals.

In operation the exponential multipler has the effect of executing the following equations:

$$I_o = I_1 \times C + q_1 \times S$$

$$Q_o = Q_1 \times C - I_1 \times S$$

Using exponential representations for the inputs, $$A(t)e^{j\omega t} = I_1 + jQ_1$$

$$e^{j\Omega t} = C + jS$$

where A(t) is a data signal and $\omega$ and $\Omega$ are the angular frequencies of the two input signals. The exponential multiplier effectively outputs the product of these two exponentials, hence its name.

Using a trigonometric representation for the inputs, $$I_1 = A(g)\cos\omega t, \quad q_1 = A(t)\sin\omega t$$

$$C = \cos\Omega t, \quad S = \sin\Omega t$$

Applying the exponential multiplication, $$I_o = A(t)[\cos\omega t \cdot \cos\Omega t - \cos\omega t \cdot \sin\Omega t]$$

which simplify to, $$I_o = A(t)\cos(\omega - \Omega)t$$

$$Q_o = A(t)\sin(\omega - \Omega)t$$

Figure 6:
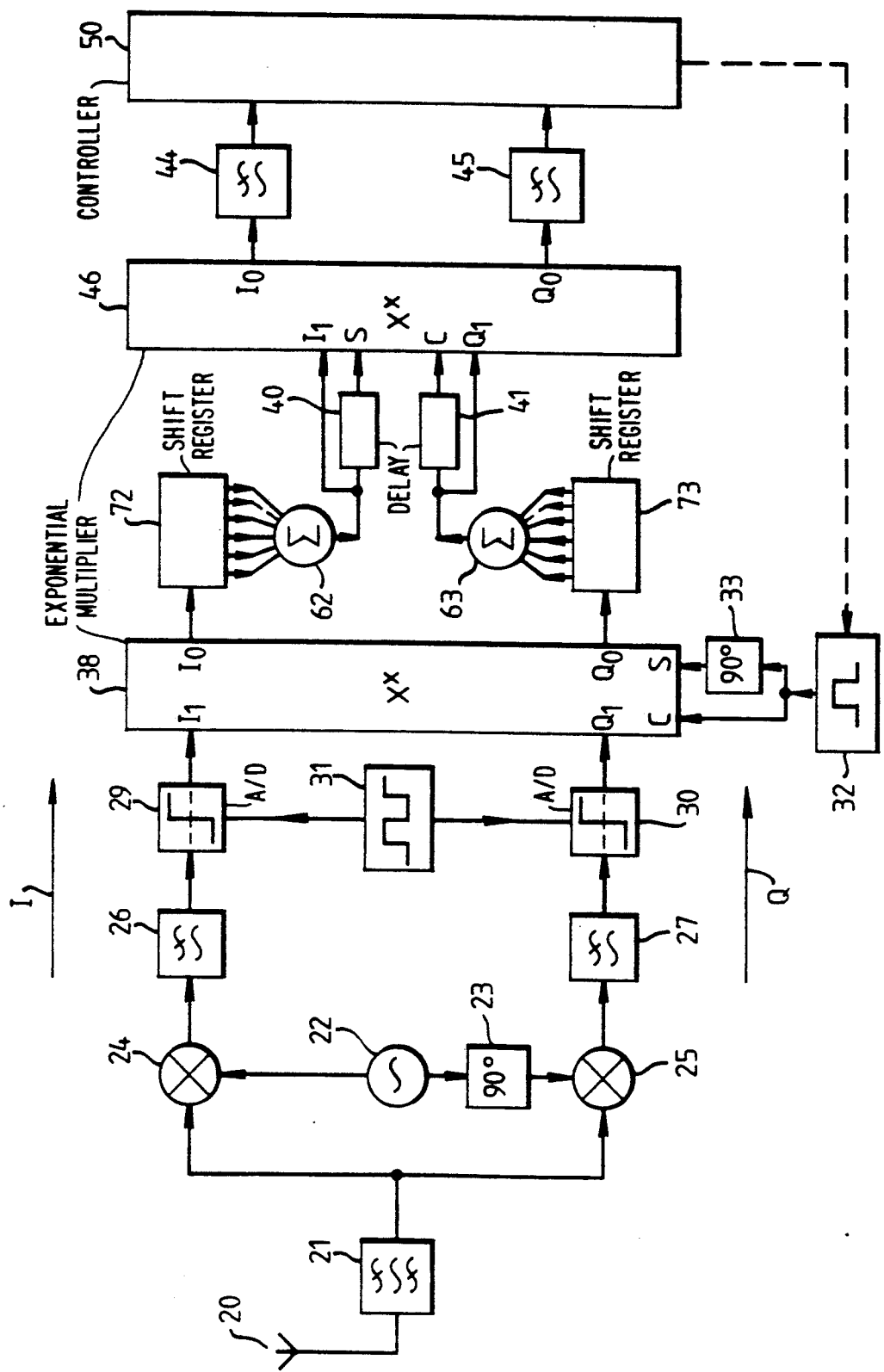
FIG. 6 is a block schematic diagram of a receive with a non-coherent demodulator using separate exponential multipliers to effect the final frequency down-conversion and the non-coherent demodulation.

It can be seen that the exponential multiplier can perform frequency conversions without generation of image frequencies as does normal mixing. This process is applicable in two main areas of the previously described spread spectrum radio receiver, namely, the removal of the Doppler offset frequency and the performance of the baseband non-coherent demodulation. An embodiment of the invention that exploits the EM in both of these areas will not be described with reference to FIG. 6.

Referring to the Figure, the spread spectrum signals from those satellites currently in view are received by the antenna 20 and are fed to an amplification and bandpass filtering means 21. In some cases the bandpass filtering means 21 may comprise a more complex circuit performing frequency translation as well as bandpass filtering. The output of this means 21 is frequency down converted to a pair of quadrature related signals by mixers 24 and 25 which are fed with local oscillator signals by the local oscillator 22 and a 90° phase shifter 23 connected to the local oscillator 22. These two quadrature signals are fed to low pass filters 26 and 27 to remove the unwanted frequency components in the outputs of the mixing process. The signals are then separately quantized by two analogue to digital (A/D) converters, 29 and 30, which are driven by a clock 31 at a rate equal to or higher than that which satisfies the Nyquist sampling criterion with respect to the output bandwidth of filters 26 and 27, which equals or exceeds the bandwidth of the satellite C/A code. The outputs of A/D converters 29 and 30 are fed to the $I_1$ and $Q_1$ inputs respectively of an exponential multiplier 38. The exponential multiplier 38 has its input C fed from a local oscillator 32 and its input S fed from a 90° phase shifter 33 which is connected to the local oscillator 32. The output of the EM 38 is a pair of baseband quadrature components which enter a pair of shift registers 72, 73, output $I_o$ being fed to shift register 72 and output $Q_o$ being fed to shift register 73. In this mode of operation the shift registers provide the delays required to implement the comb filtering of the two signals, as described previously with reference to FIG. 4. A pair of summers 62 and 63 add the outputs of shift registers 72 and 73, respectively. The two comb filtered signals are then split into two paths each, the first from the In-phase signal is fed to delay 40 and the first path from the Quadrature signal is fed to delay 41. Delays 40 and 41 have a duration equal to the length of one data bit. The delayed output of the comb filter in the In-phase channel is fed to the S terminal of exponential multiplier 46 and the undelayed output of the comb filter is fed to terminal $I_1$. Likewise the delayed output of the comb filter in the Quadrature channel is fed to terminal C of the exponential multiplier 46 and the undelayed output is fed to terminal $Q_1$. Outputs $I_o$ and $Q_o$ of the exponential multiplier 46 are filtered by low-pass filters 44 and 45, respectively, before being fed to a controller 50. The controller 50 determines the frequency of local oscillator 32 in order that the frequency band over which satellite signals may occur is searched in sufficiently small frequency steps, for example every 50 Hz. The controller can then store ephemeris data from all visible satellites as well as the current Doppler frequency offset of each satellite's signals, as perceived by the receiver.

Figure 7:
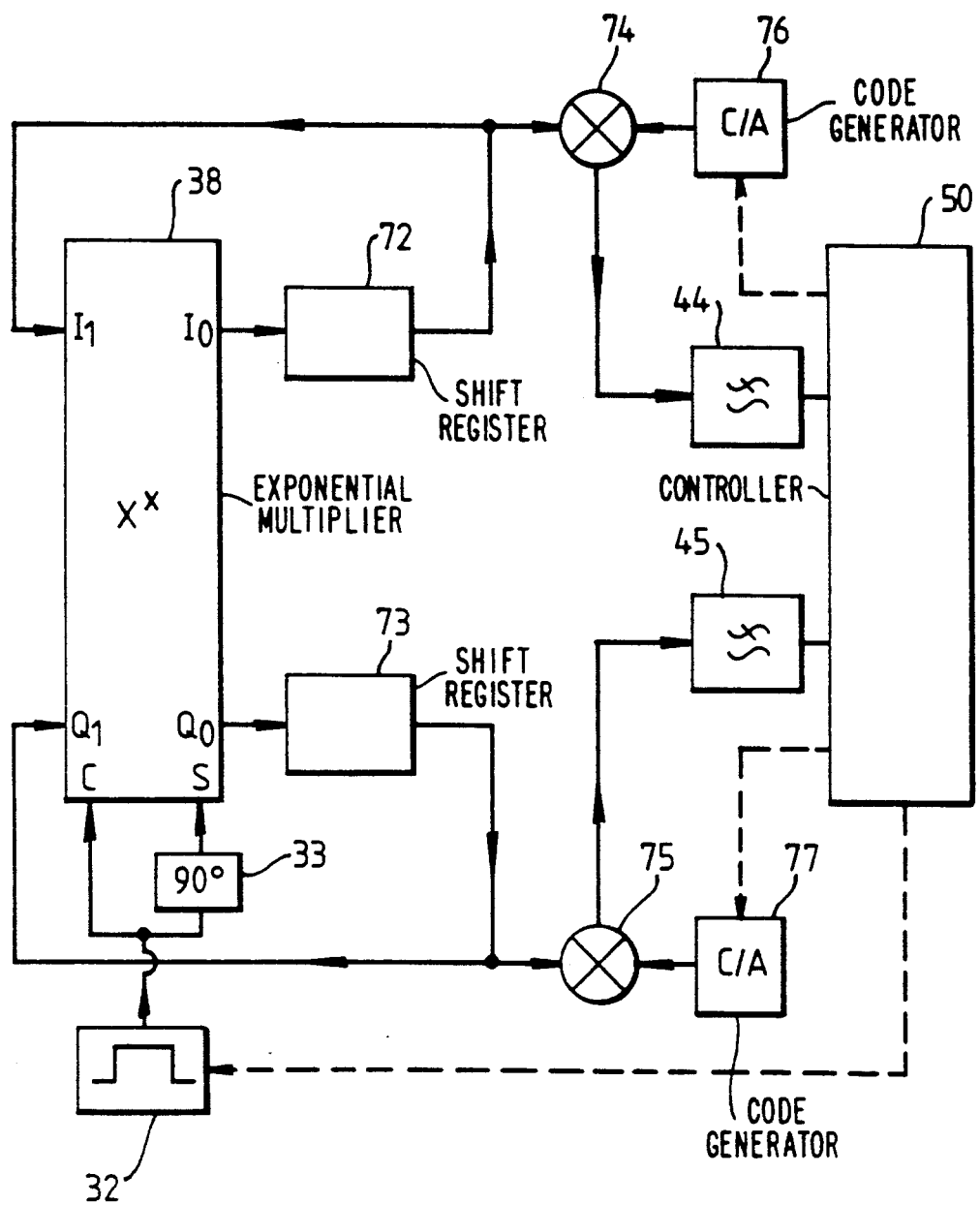
FIG. 7 is a block schematic diagram of those sections of the receiver of FIG. 6 and additional hardware which are used to make signal transit time measurements in a NAVSTAR GPS.

The receiver described in the preceding paragraph cannot determine the range of any of the satellites and so, as it stands, cannot made a measurement of the receiver's position. An extension of the receiver to facilitate this will now be described with reference to FIG. 7 which shows the additional circuitry required to make signal transit time measurements. Those parts of the receiver common to both FIGS. 6 and 7 have been identified using the same reference numerals.

The inputs $I_1$ and $Q_1$ of exponential multiplier 38 are no longer fed by analogue to digital converters 29 and 30 but are now fed from the outputs of shift registers 72 and 73, respectively. The outputs $I_o$ and $Q_o$ of the exponential multiplier 38 are fed to the inputs of shift registers 72 and 73 as before. Inputs C and S of EM 38 are fed by local oscillator 32 and 90° phase shifter 33 connected to local oscillator 32 respectively, as before. In addition to being fed to the $I_1$ and $Q_1$ inputs of EM 38, the outputs of shift registers 72 and 73 are each fed to one input of a pair of multipliers 74 and 75, respectively. Low pass filters 44 and 45 are no longer fed from EM 46, they are now fed from the outputs of multipliers 74 and 75, respectively. The outputs of the low pass filters 44 and 45 are connected to the controller 50 as before. The controller 50 also governs the generation of the C/A code for the satellite under scrutiny, two separate C/A code generators 76 and 77 are shown here for clarity, although in practice only one is required. The outputs of the C/A code generators are fed to the remaining inputs of the multipliers 74 and 75, respectively.

The operation of the receiver after it has stored a section of satellite data in shift registers 72 and 73 will now be described for convenience by reference to the In-phase I channel only. The Quadrature Q channel operates in an entirely analogous manner. From the operation of the receiver shown in FIG. 6 there will be 20 ms of satellite data held in shift register 72. This data includes signals from all visible satellites but the data still has a Doppler frequency offset and is still encrypted by the C/A code. To determine the pseudorange of the user from each satellite, the data held in shift register 72 is circulated through exponential multiplier 38 and back into the shift register to remove the Doppler frequency offset from the signals of the satellite of interest. Once this is achieved the data continues to circulate, although no frequency conversion is being carried out. The baseband signals circulating via the shift register and exponential multiplier are fed to multiplier 74 whose second input is fed from C/A code generator 76. The controller 50 monitors the output of low pass filter 44 whose input is fed by the output of multiplier 74. The controller constantly adjusts the phase of the code generated by C/A code generator 76 and when a peak is detected at the output of the mixer 74 the point of correlation has been found. From the point of correlation, the controller can calculate the sub-millisecond part of the receiver's pseudorange from that satellite. This process is repeated for each satellite and when an adequate number of pseudoranges are known the user's portion can be calculated.

This receiver has appreciable advantages over a conventional design, namely that it can acquire satellite signals much more quickly, it records all the satellite signals at the same instant allowing relaxation of the stability required of the first local oscillator(s) and the offline signal processing should permit a less powerful processor to control the receiver. As a result the receiver can make accurate positional fixes after a much shorter period of satellite visibility than a conventional design.

From reading the present disclosure other modifications will be apparent to persons skilled in the art. Such modifications may involve other features which are already known in the design, manufacture and use of radio receivers for use with direct sequence spread spectrum systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A radio receiver for use with direct sequence spread spectrum signals which have been spread in frequency by a pseudo random noise (PRN) sequence having a repetition frequency, comprising means for producing a pair of quadrature related signals in respective channels from a received direct sequence spread spectrum signal, comb filtering means for respectively filtering the quadrature related signals at n times the repetition frequency to produce comb-filtered signals, where n is an integer, and means for non-coherently demodulating and despreading the comb-filtered signals.

2. A radio receiver for use with the NAVSTAR global positioning system (GPS), said system comprising means for producing a plurality of satellite transmission, each satellite transmission including a coarse/acquisition (C/A) code having a repetition frequency; wherein said receiver comprises means for producing a pair of quadrature related signals in respective channels from a received satellite transmission, comb filtering means for respectively filtering the quadrature related signals at n times the repetition frequency of the coarse/acquisition (C/A) code to produce comb-filtered signals, where n is an integer, and means for non-coherently demodulating and despreading the comb-filtered signals.

3. A radio receiver as claimed in claim 1, wherein the quadrature related signals are represented digitally.

4. A radio receiver as claimed in claim 2, further comprising means for storing incoming signals from satellites at respective ranges; means for cancelling various Doppler offset frequencies present; a pair of mixers, each mixer being associated with a respective channel; means for applying the stored signals separately at a given rate to respective first inputs of said pair of mixers; means for applying a replica of a coarse-acquisition code to second inputs of said mixers; control means for setting a particular Doppler frequency offset; and means for measuring the sub-millisecond part of a pseudorange of a satellite from which an incoming signal has been received.

5. A radio receiver as claimed in claim 2, in which the means for producing the pair of quadrature related signals includes a first down conversion stage to produce a pair of quadrature related signals at an Intermediate Frequency (IF), and a second down conversion stage receiving said par of quadrature related signals and any residual IF introduced by said first down conversion stage, said second down conversion stage including exponential amplifier means for removing said residual IF.

6. A radio receiver as claimed in claim 5, in which the means for non-coherently demodulating and despreading the comb-filtered signals in each channel includes means for producing respective delayed signals which are replicas of the signals in each channel delayed by the duration of one data bit, and means for mixing the respective signal in each channel and the corresponding delayed signal.

7. A radio receiver as claimed in claim 6, in which the means for mixing the respective signal in each channel and the corresponding delayed signal is an exponential amplifier.

8. A radio receiver as claimed in claim 7, in which the comb filtering means includes a plurality of delay stages having respective outputs, and means for summing the outputs of the delay stages.

9. A radio receiver as claimed in claim 2, in which the comb filtering means includes a plurality of delay stages having respective outputs, and means for summing the outputs of the delay stages.

10. A radio receiver as claimed in claim 2, in which the means for non-coherently demodulating and despreading the comb-filtered signals in each channel includes means for producing respective delayed signals which are replicas of the signals in each channel delayed by the duration of one data bit, and means for mixing the respective signal in each channel and the corresponding delayed signal.

11. A radio receiver as claimed in claim 10, in which the means for mixing the respective signal in each channel and the corresponding delayed signal is an exponential amplifier.

12. A radio receiver as claimed in claim 1, in which the comb filtering means includes a plurality of delay stages having respective outputs, and means for summing the outputs of the delay stages.

13. A radio receiver as claimed in claim 1, in which the means for non-coherently demodulating and despreading the comb-filtered signals in each channel includes means for producing respective delayed signals which are replicas of the signals in each channel delayed by the duration of one data bit, and means for mixing the respective signal in each channel and the corresponding delayed signal.

14. A radio receiver as claimed in claim 13, in which the means for mixing the respective signal in each channel and the corresponding delayed signal is an exponential amplifier.

15. A radio receiver as claimed in claim 1, in which the means for producing the pair of quadrature related signals includes a first down conversion stage to produce a pair of quadrature related signals at an Intermediate Frequency (IF), and a second down conversion stage receiving said pair of quadrature related signals and any residual IF introduced by said first down conversion stage, said second down conversion stage including exponential amplifier means for removing said residual IF.

16. A radio receiver as claimed in claim 15, in which the means for non-coherently demodulating and despreading the comb-filtered signals in each channel includes means for producing respective delayed signals which are replicas of the signals in each channel delayed by the duration of one data bit, and means for mixing the respective signal in each channel and the corresponding delayed signal.

17. A radio receiver as claimed in claim 16, in which the means for mixing the respective signal in each channel and the corresponding delayed signal is an exponential amplifier.

* * * * *